US012397403B2

(12) United States Patent
Machida et al.

(10) Patent No.: US 12,397,403 B2
(45) Date of Patent: Aug. 26, 2025

(54) RECIPROCATING TOOL

(71) Applicant: MAKITA CORPORATION, Anjo (JP)

(72) Inventors: Yoshitaka Machida, Anjo (JP); Yusuke Takano, Anjo (JP); Makoto Chikaraishi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/380,429

(22) Filed: Oct. 16, 2023

(65) Prior Publication Data

US 2024/0149419 A1 May 9, 2024

(30) Foreign Application Priority Data

Nov. 4, 2022 (JP) ................................ 2022-177511
Jun. 27, 2023 (JP) ................................ 2023-104865
Jun. 27, 2023 (JP) ................................ 2023-104868

(51) Int. Cl.
*B25D 17/04* (2006.01)
*B25D 11/04* (2006.01)
(Continued)

(52) U.S. Cl.
CPC ............ *B25D 11/064* (2013.01); *B25D 11/04* (2013.01); *B25D 17/20* (2013.01); *B25F 5/006* (2013.01);
(Continued)

(58) Field of Classification Search
CPC ...... B25D 11/064; B25D 11/04; B25D 17/20; B25D 2211/003; B25D 2217/0076;
(Continued)

(56) References Cited

U.S. PATENT DOCUMENTS 6,127,751 A * 10/2000 Kristen .................. B25D 17/20 173/117
6,851,898 B2 2/2005 Ege et al.
(Continued)

FOREIGN PATENT DOCUMENTS

JP 2006-334725 A 12/2006
JP 2013-013951 A 1/2013
(Continued)

OTHER PUBLICATIONS

Nov. 1, 2024 Office Action issued in U.S. Appl. No. 18/380,398.
(Continued)

*Primary Examiner* — Thanh K Truong
*Assistant Examiner* — David G Shutty
(74) *Attorney, Agent, or Firm* — Oliff PLC

(57) ABSTRACT

A reciprocating tool includes a motor, a motion converting mechanism, a body housing, an inner housing, a support body, and a counterweight. The motion converting mechanism is operably coupled to a motor shaft and is configured to convert rotation into a linear reciprocating motion along a driving axis. The inner housing is within the body housing and houses at least a portion of the motion converting mechanism. The support body is originally separate from the inner housing and is attached to the inner housing in the body housing. The counterweight is operably coupled to the motion converting mechanism and is configured to be driven by the motion converting mechanism. The counterweight is supported by the support body to be pivotable around a pivot axis that extends in a direction orthogonal to the driving axis. At least a portion of the counterweight is housed in the inner housing.

16 Claims, 10 Drawing Sheets

(51) Int. Cl.
*B25D 11/06* (2006.01)
*B25D 17/20* (2006.01)
*B25D 17/24* (2006.01)
*B25F 5/00* (2006.01)

(52) U.S. Cl.
CPC .................. *B25D 2211/003* (2013.01); *B25D 2217/0076* (2013.01); *B25D 2250/005* (2013.01); *B25D 2250/121* (2013.01); *B25D 2250/365* (2013.01); *B25D 2250/375* (2013.01)

(58) Field of Classification Search
CPC ........ B25D 2250/005; B25D 2250/121; B25D 2250/365; B25D 2250/375; B25F 5/006
See application file for complete search history.

(56) References Cited

U.S. PATENT DOCUMENTS

| | | | | |
|---|---|---|---|---|
| 7,308,950 | B2 * | 12/2007 | Faatz | B25F 5/008 173/171 |
| 7,588,097 | B2 * | 9/2009 | Kamegai | B25D 11/062 173/217 |
| 7,705,497 | B2 * | 4/2010 | Arich | B25D 17/20 310/58 |
| 9,156,152 | B2 * | 10/2015 | Machida | B25D 17/24 |
| 9,321,163 | B2 * | 4/2016 | Onoda | B25D 11/062 |
| 2003/0132016 | A1 | 7/2003 | Meixner et al. | |
| 2006/0272836 | A1 | 12/2006 | Hirayama et al. | |
| 2008/0210447 | A1 | 9/2008 | Robieu | |
| 2013/0000937 | A1 | 1/2013 | Onoda et al. | |
| 2018/0345469 | A1 | 12/2018 | Tanabe et al. | |
| 2019/0314971 | A1 | 10/2019 | Yoshikane et al. | |
| 2020/0078919 | A1 | 3/2020 | Machida et al. | |
| 2022/0258320 | A1 * | 8/2022 | Machida | B25D 17/20 |
| 2022/0388106 | A1 | 12/2022 | Yoshikane et al. | |
| 2023/0415323 | A1 * | 12/2023 | Ichikawa | B25F 5/006 |

FOREIGN PATENT DOCUMENTS

| | | | |
|---|---|---|---|
| JP | 2019-181605 | A | 10/2019 |
| JP | 2020-040161 | A | 3/2020 |
| JP | 2022-185909 | A | 12/2022 |

OTHER PUBLICATIONS

U.S. Appl. No. 18/380,398, filed Oct. 16, 2023 in the name of Yoshitaka Machida et al.
U.S. Appl. No. 18/380,412, filed Oct. 16, 2023 in the name of Yoshitaka Machida et al.
Apr. 11, 2025 Office Action issued in U.S. Appl. No. 18/380,398.

* cited by examiner

RECIPROCATING TOOL

CROSS-REFERENCE TO RELATED APPLICATION

The present application claims priority to Japanese patent applications No. 2022-177511 filed on Nov. 4, 2022, No. 2023-104865 filed on Jun. 27, 2023, and No. 2023-104868 filed on Jun. 27, 2023. The contents of the foregoing applications are hereby incorporated by reference in their entirety.

TECHNICAL FIELD

The present disclosure relates to a reciprocating tool that is configured to linearly reciprocate a tool accessory.

BACKGROUND

A reciprocating tool is configured to linearly reciprocate a tool accessory along a driving axis. When the tool accessory is driven, relatively large vibration is caused in an extension direction of the driving axis. Thus, some known reciprocating tools include a counterweight for reducing the vibration. For example, a power tool having a hammer mechanism that is disclosed in Japanese laid-open patent publication No. 2013-013951 includes a motion converting mechanism and a counter weight. The motion converting mechanism is configured to be driven by a motor. The counterweight is disposed in an internal space of a housing member (an inner housing) and is supported by the housing member to be pivotable around a pivot axis. The counterweight is operably coupled to the motion converting mechanism and is pivoted around the pivot axis by the motion converting mechanism.

SUMMARY

The above-described housing member needs to support the counterweight that is operably coupled to the motion converting mechanism. Therefore, there are constraints in design of the housing member. Thus, there is still room for improvement in a supporting structure of the counterweight in view of the degree of freedom in the design of the housing member.

Accordingly, it is a non-limiting object of the present disclosure to provide a reciprocating tool having an improved supporting structure of a counterweight.

One non-limiting embodiment according to the present disclosure herein provides a reciprocating tool that is configured to linearly reciprocate a tool accessory. The reciprocating tool includes a motor, a motion converting mechanism, a body housing, an inner housing, a support body, and a counterweight.

The motor has a motor shaft that is rotatable round a motor axis. The motion converting mechanism is operably coupled to the motor shaft. The motion converting mechanism is configured to convert rotation into linear reciprocating motion along a driving axis. The driving axis defines a front-rear direction of the reciprocating tool. The inner housing is disposed within the body housing. The inner housing houses at least a portion of the motion converting mechanism. The support body is originally separate (discrete) from the inner housing, and is attached to the inner housing. The counterweight is operably coupled to the motion converting mechanism. The counterweight is configured to be driven by the motion converting mechanism.

The counterweight is supported by the support body to be pivotable around a pivot axis that extends in a direction orthogonal to the driving axis. At least a portion of the counterweight is within the inner housing.

The reciprocating tool of this embodiment includes the counterweight that is driven by the motion converting mechanism. Thus, the counterweight can effectively reduce vibration generated during reciprocating driving of the tool accessory. Further, the counterweight is supported by the support body that is originally separate from the inner housing (i.e., a component (part) that is separate (discrete) from the inner housing) and is supported by the inner housing. Therefore, a supporting structure for the counterweight does not need to be formed integrally with the inner housing. Consequently, the degree of freedom in design of the inner housing can be enhanced.

DETAILED DESCRIPTION OF THE EMBODIMENTS

Figure 1:
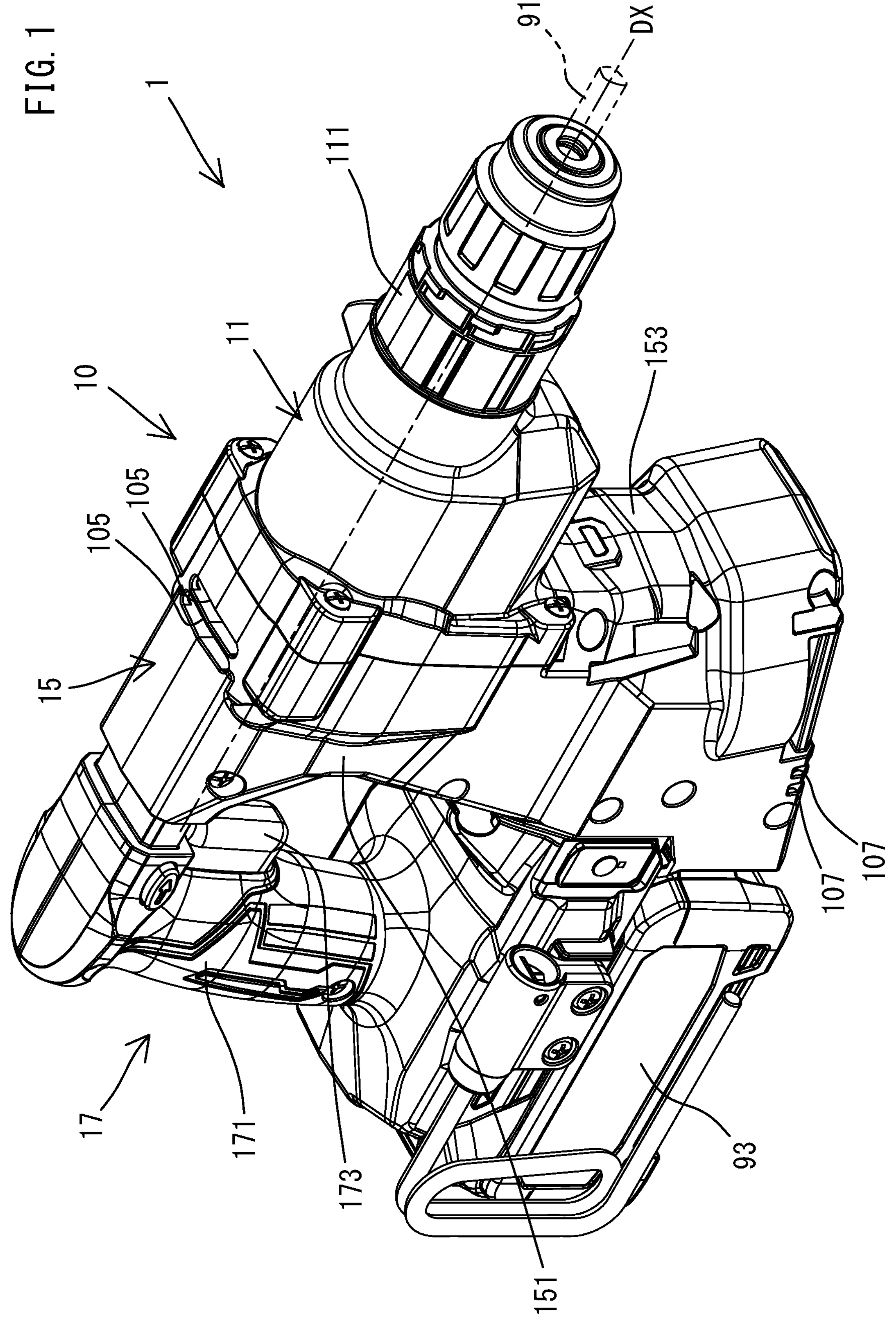
FIG. 1 is a perspective view of a rotary hammer.

In one non-limiting embodiment according to the present disclosure, the counterweight may be supported by the support body via a support shaft that extends along the pivot axis. The support shaft may be in an internal space of the inner housing. The internal space of the inner housing herein means a space that is surrounded by an outer shell (a wall part or wall parts) of the inner housing. According to this embodiment, at least a portion of the counterweight that is supported by the support body via the support shaft can be easily placed within the inner housing.

In addition or in the alternative to the preceding embodiments, the support body may include a main body and an arm part. The main body is at least partially on an outside of the inner housing. The arm part protrudes from the main body into the inner housing and supports the support shaft. According to this embodiment, the support shaft that is supported by the arm part can be easily placed within the inner housing.

In addition or in the alternative to the preceding embodiments, the reciprocating tool may further include a seal member that is disposed (interposed) between the body housing and the inner housing. The seal member may be frontward of the pivot axis of the counterweight in the front-rear direction. In a known-structure in which the inner housing itself directly supports the counterweight, in order to lubricate a supporting structure of the counterweight, the seal member is disposed rearward of the pivot axis of the counterweight. On the contrary, in this embodiment, the seal member is disposed frontward of the pivot axis. Owing to such configuration, a surface area of a portion of the inner housing that extends rearward of the seal member can be made larger. Consequently, the inner housing can be effectively cooled.

In addition or in the alternative to the preceding embodiments, an extension direction of the pivot axis may define a left-right direction of the reciprocating tool. A direction that is orthogonal to the front-rear direction and the left-right direction may define an up-down direction of the reciprocating tool. The body housing may include an air inlet opening and an air outlet opening. The air inlet opening may be above an upper end of the seal member in the up-down direction, and the air outlet opening may be below a lower end of the seal member in the up-down direction. According to this embodiment, the inner housing can be effectively cooled by air that flows into the body housing through the air inlet opening and flows out of the body housing through the air outlet opening.

In addition or in the alternative to the preceding embodiments, the reciprocating tool may further include a spindle and a hammer (striking) element that is disposed within the spindle. The spindle may be configured to hold the tool accessory to be movable along the driving axis. The striker may be configured to be driven by the motion converting mechanism to apply a striking force to the tool accessory. In other words, the reciprocating tool may be configured as a power tool having a hammer (striking) mechanism. The support body may be configured to support the spindle. According to this embodiment, the support body, which pivotably supports the counterweight, can be utilized to support the spindle as well.

In addition or in the alternative to the preceding embodiments, the reciprocating tool may further include an intermediate shaft. The intermediate shaft may be operably coupled to the motor shaft and rotatable around a rotational axis that extends in parallel to the driving axis. A portion of the motion converting mechanism may be disposed on the intermediate shaft. According to this embodiment, a compact reciprocating tool having the counterweight can be achieved.

In addition or in the alternative to the preceding embodiments, the motor axis may intersect the rotational axis of the intermediate shaft. According to this embodiment, a reciprocating tool having an L-shape can be achieved.

In addition or in the alternative to the preceding embodiments, an extension direction of the pivot axis may define a left-right direction of the reciprocating tool. A direction that is orthogonal to the front-rear direction and the left-right direction may define an up-down direction of the reciprocating tool. The body housing may include an air inlet opening and an air outlet opening. The air inlet opening may be above the driving axis in the up-down direction. According to this embodiment, the inner housing can be effectively cooled by air that flows into the body housing through the air inlet opening and flows out of the body housing through the air outlet opening.

In addition or in the alternative to the preceding embodiments, an air passage may be defined in the body housing. The air passage may be configured such that air, which has flowed into the body housing through the air inlet opening, flows along the inner housing, passes through an inside of the motor, and flows out of the body housing through the air outlet opening. According to this embodiment, the inner housing and the motor can be effectively cooled by the air that flows into the body housing through the air inlet opening and flows out of the body housing through the air outlet opening.

A rotary hammer (hammer drill) 1 according to a representative, non-limiting embodiment of the present disclosure is now described with reference to FIGS. 1 to 10. The rotary hammer 1 is a power tool that is configured to perform a hammer action. In the hammer action, a tool accessory 91 that is removably held by the rotary hammer 1 is hammered (stricken), and thereby the tool accessory 91 is linearly reciprocated along a driving axis DX. Thus, the rotary hammer 1 is an example of a reciprocating tool and is also an example of a power tool having a hammer (striking) mechanism. The rotary hammer 1 may perform a rotary action and the hammer action at the same time, or perform the rotary action in the alternative to the hammer action. In the rotary action, the tool accessory 91 is rotationally driven around the driving axis DX.

Figure 2:
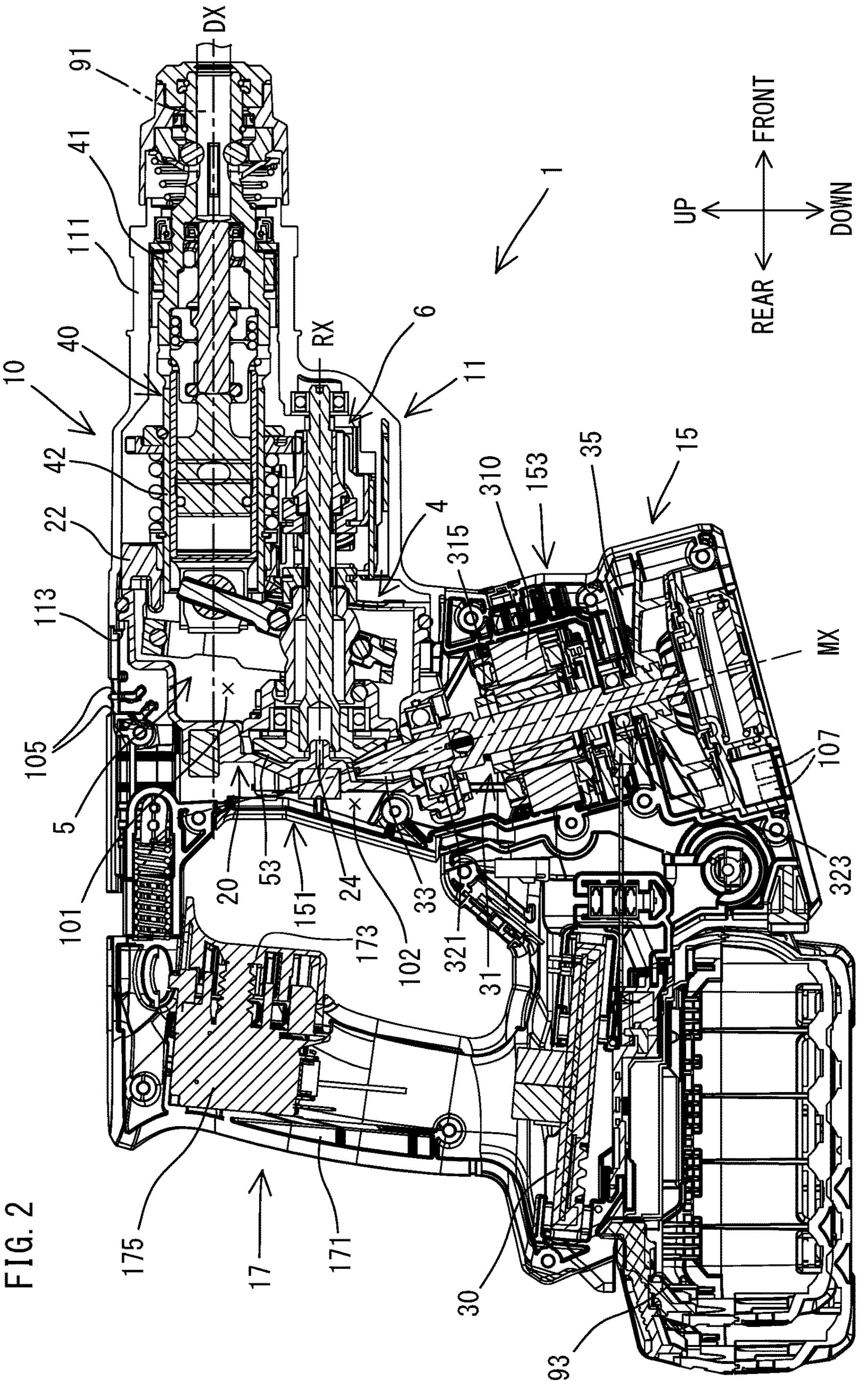
FIG. 2 is a sectional view of the rotary hammer.

First, the general structure of the rotary hammer 1 is described. As shown in FIGS. 1 and 2, an outline of the rotary hammer 1 is defined by a body housing 10 and a handle 17 that is coupled to the body housing 10.

The body housing 10 is a hollow body that is also referred to as a tool body or an outer shell. The body housing 10 of this embodiment includes a first housing part 11 and a second housing part 15.

As shown in FIG. 2, the first housing part 11 mainly houses a spindle 40, which is a member for holding a tool accessory (i.e., a tool accessory holding member), and a driving mechanism 4 for driving the tool accessory 91. The spindle 40 is an elongate tubular member. One end portion of the spindle 40 in its longitudinal direction is structured as a tool holder 41 that is configured to removably hold the tool accessory 91. A longitudinal axis of the tool holder 41 (the spindle 40) defines the driving axis DX of the tool accessory 91.

The first housing part 11 extends along the driving axis DX. A first end portion of the first housing part 11 in an extension direction of the driving axis DX has a hollow cylindrical shape, and the tool holder 41 is housed in this end portion, which is also referred to as a barrel part 111. The remaining portion of the first housing part 11 has a tubular shape that has a larger diameter than the barrel part 11 and has an opening 113 at an end that is opposite to the barrel part 11. A metal inner housing 20 is fitted into a second end portion defining the opening 113 of the first housing part 11 so as to close the opening 113. Accordingly, a first space 101 is defined that is surrounded by the inner housing 20 and the first housing part 11. The spindle 40 and the driving mechanism 4 are disposed in the first space 101. Thus, an entirety of the first housing part 11 and the inner housing 20 may be defined as one single housing (a so-called gear housing) that houses the spindle 40 and the driving mechanism 4.

The second housing part 15 mainly houses a motor 31. The second housing part 15 is coupled to the second end portion of the first housing part 11 that is opposite to the barrel part 111 in the extension direction of the driving axis DX, and extends in a direction that intersects (more specifically, substantially orthogonal to) the driving axis DX. The body housing 10 including the first housing part 11 and the second housing part 15 is thus formed in an L-shape as a whole. A portion of the second housing part 15 surrounds or covers the inner housing 20 from the outside thereof.

The handle 17 is a hollow member that has a U-shape as a whole. Opposite ends of the handle 17 are coupled to the body housing 10 (the second housing part 15). The handle 17 includes a grip part 171 that is configured to be gripped by a user. The grip part 171 extends in a direction that intersects (specifically, substantially orthogonal to) the driving axis DX. The grip part 171 extends generally in parallel to an extension direction of the second housing part 15. The grip part 171 has a trigger 173 to be depressed by the user, and houses a switch 175. A lower end portion of the handle 17 houses a controller 30 that is configured to control operation of the rotary hammer 1. A battery 93 is removably mounted to the lower end portion of the handle 17. When the trigger 173 is depressed and thus the switch 175 is turned ON, the controller 30 starts driving of the motor 31, so that the driving mechanism 4 drives the tool accessory 91.

The detailed structure of the rotary hammer 1 is now described. In the following description, for the sake of convenience, the extension direction of the driving axis DX is defined as a front-rear direction of the rotary hammer 1. In the front-rear direction, the side on which a distal end of the tool holder 41 is located (i.e., the side on which the tool accessory 91 is inserted into the tool holder 41) is defined as a front side of the rotary hammer 1, while the opposite side is defined as a rear side of the rotary hammer 1. A direction that is orthogonal to the driving axis DX and that substantially corresponds to an extension direction of the second housing part 15 (also an extension direction of the grip part 171) is defined as an up-down direction of the rotary hammer 1. In the up-down direction, the side on which the first housing part 11 is located is defined as an upper side of the rotary hammer 1, while an opposite side is defined as a lower side of the rotary hammer 1. A direction that is orthogonal to both of the front-rear direction and the up-down direction is defined as a left-right direction.

First, the detailed structures of the body housing 10 and the inner housing 20 are described.

Figure 3:
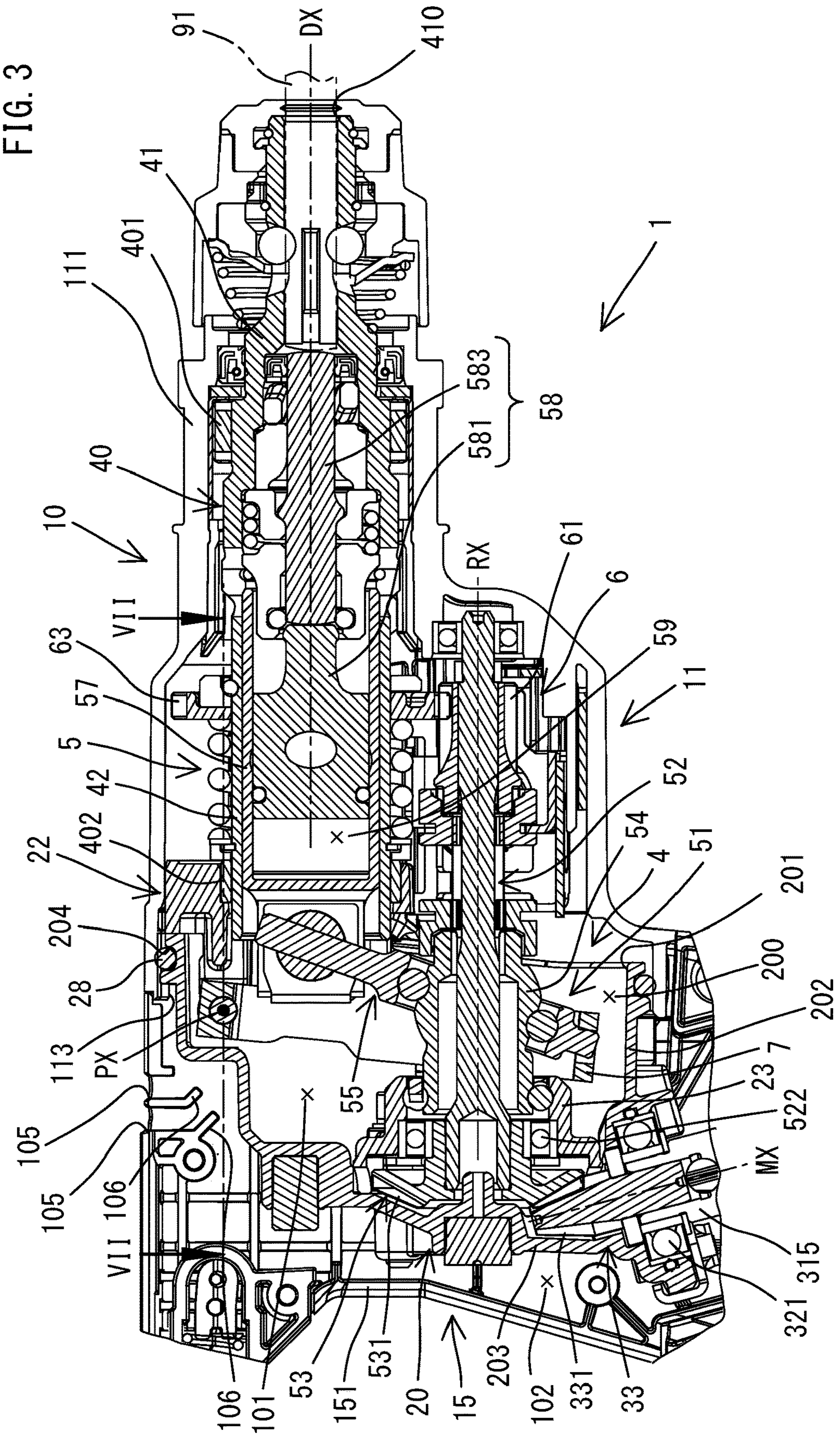
FIG. 3 is a partial, enlarged view of FIG. 2.
Figure 4:
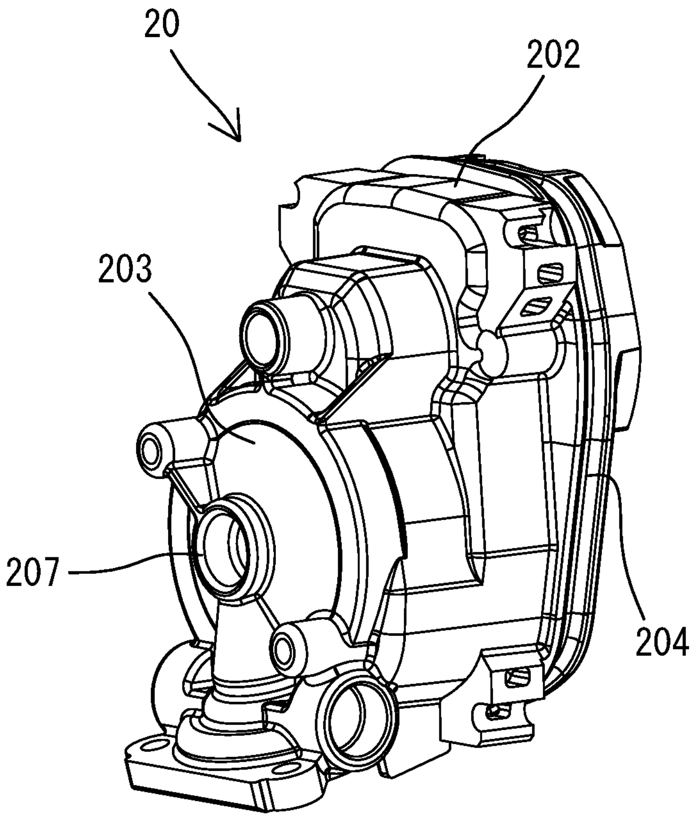
FIG. 4 is a perspective view of an inner housing.
Figure 5:
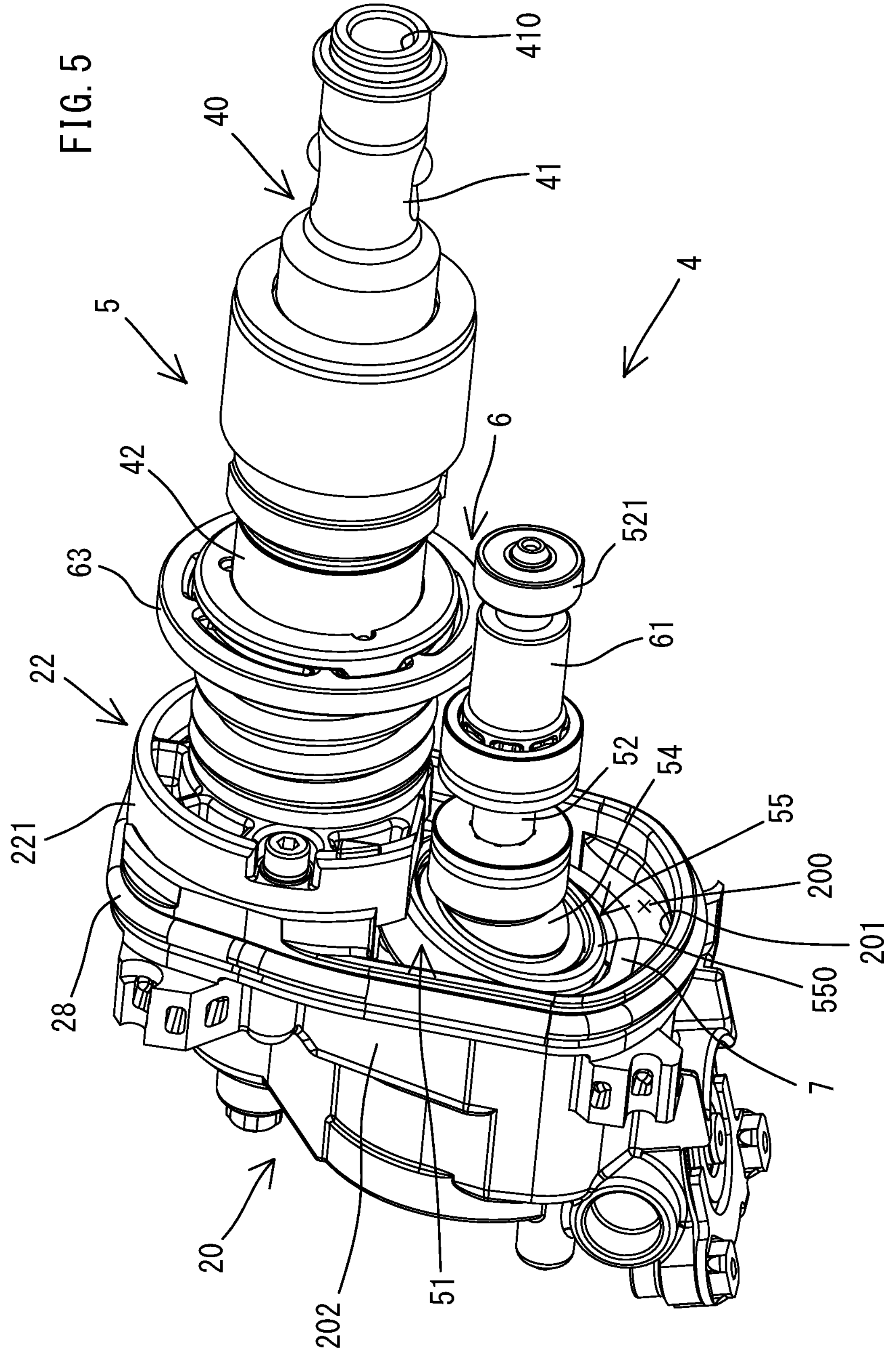
FIG. 5 is a perspective view of a support body and a driving mechanism that are mounted on the inner housing.

As described above, the first housing part 11 is a tubular member as a whole, and the opening 113 at a rear end portion is closed by the inner housing 20. As shown in FIGS. 3 to 5, the inner housing 20 is a hollow body that has an opening 201 and an internal space 200. The inner housing 20 is disposed such that the opening 201 is directed forward, and fitted into the rear end portion of the first housing part 11 that defines the opening 113. More specifically, the inner housing 20 includes a tubular peripheral (circumferential) wall part 202 that defines the opening 201, and a rear wall part 203 that is connected to the peripheral wall part 202. The internal space 200 opens frontward, is surrounded by the peripheral wall part 202 in a circumferential direction around the driving axis DX, and a rear end of the internal space 200 is closed by the rear wall part 203.

An annular groove 204 is formed on an annular region, which is adjacent to the opening 201 and extends in the circumferential direction, of an outer surface of the peripheral wall part 202. An annular seal member 28 is fitted in the groove 204 of the inner housing 20. The seal member 28 is formed as, for example, an annular elastic member (e.g., a rubber O-ring). The seal member 28 is compressed between an inner surface of the rear end portion of the first housing part 11 and the outer surface of the peripheral wall part 202 of the inner housing 20, so as to seal a gap between the first housing part 11 and the inner housing 20. Thus, the closed first space 101 is defined by the first housing part 11 and the inner housing 20. The spindle 40, and the driving mechanism 4 are disposed in the first space 101, together with lubricant (e.g., grease).

As shown in FIGS. 1 and 2, the second housing part 15 is a hollow body that is coupled to the rear end portion of the first housing part 11 and extends in the up-down direction. An upper half 151 of the second housing part 15 is coupled to the rear end portion of the first housing part 11, using screws. In this embodiment, the second housing part 15 is formed by two halves that are originally divided in the left-right direction (i.e., left and right halves) and coupled to each other using screws. The inner housing 20 is within the upper half 151 of the second housing part 15. The motor 31 is disposed within a lower half 153 of the second housing part 15 (a portion of the second housing part 15 that extends downward of a portion that houses the inner housing 20).

Owing to the above-described configuration, two spaces that are partitioned by the inner housing 20 are defined within the body housing 15. More specifically, the two spaces include the first space 101 in which the spindle 40 and the driving mechanism 4 are disposed together with lubricant, and a second space 102 in which the motor 31 is mainly disposed. The first space 101 and the second space 102 are also separated (isolated) by the seal member 28 that is disposed (interposed) between the inner housing 20 and the body housing 10 (the first housing part 11).

The elements (structures) disposed within the body housing 10 are now described.

First, the motor 31 is described. As shown in FIG. 2, the motor 31 is within the lower half 153 of the second housing part 15. The motor 31 has a motor body 310, which includes a stator and a rotor, and a motor shaft 315. The motor shaft 315 extends from the rotor and is configured to rotate integrally with the rotor around a motor axis MX. In this embodiment, the motor 31 is disposed such that the motor axis MX extends slightly obliquely relative to the up-down direction of the rotary hammer 1 and obliquely intersects the driving axis DX. However, the motor 31 may be disposed such that the motor axis MX extends in the up-down direction so as to orthogonally intersect the driving axis DX.

A first bevel gear 33 is coupled to an upper end portion of the motor shaft 315. The first bevel gear 33 is configured to be rotated integrally with the motor shaft 315. The motor shaft 315 is rotatably supported by two bearings 321 and 323. The upper bearing 321 is supported by a lower rear end portion of the inner housing 20. The bearing 321 rotatably supports the upper end portion of the motor shaft 315. A teeth part of the first bevel gear 33 is disposed within the inner housing 20. The teeth part herein refers to a portion of the first bevel gear 33 on which gear teeth 331 (see FIG. 3) are formed. The lower bearing 323 is supported by the second housing part 15 so as to rotatably support the motor shaft 315 below the motor body 310.

A fan 35 for cooling the motor 31 is fixed to a lower end portion of the motor shaft 315 (a portion extending downward from the bearing 323). The fan 35 is configured to be rotated integrally with the motor shaft 315 so as to generate an air flow (cooling air) that flows into the body housing 10 through air inlet openings 105, passes through the motor 31, and flows out of the body housing 10 through air outlet openings 107.

As shown in FIGS. 1 and 2, in this embodiment, the air inlet openings 105 are formed in the upper end portion (through the upper wall part) of the second housing part 15. More specifically, the air inlet openings 105 are rearward of the seal member 28 and frontward of the rear end of the inner housing 20 in the front-rear direction. Thus, the air inlet openings 105 are directly above the inner housing 20 in the up-down direction. The air outlet openings 107 are formed in the lower end portion of the second housing part 15. More specifically, the air outlet openings 107 are provided at a left side part and a right side part of the lower end portion of the second housing part 15.

Owing to the air inlet openings 105 and the air outlet openings 107 that are thus arranged, an air passage is defined in the second space 102. Specifically, the air is sucked in response to rotational driving of the fan 35 into the upper half 151 of the second housing part 15 through the air inlet opening 105, and flows downward along the inner housing 20 between the inner surface of the second housing part 15 and the outer surface of the inner housing 20. Further, the air passes between the stator and the rotor of the motor 31 disposed in the lower half 153 and reaches the fan 35. The air is delivered from the fan 35 and flows out of the second housing 15 through the air outlet opening 107.

In this embodiment, as shown in FIG. 3, guide ribs 106 are provided adjacent to the air inlet openings 105 in the second housing part 15. The guide ribs 106 are each configured to lead the air that flows into the second housing part 15 through the air inlet opening 105 toward the front side. Specifically, a lower portion of each guide rib 106 is inclined frontward and downward. Thus, the air that flows through the air inlet openings 105 is guided toward a portion of the inner housing 20 on which the seal member 28 is mounted.

The spindle 40 is now described.

As shown in FIG. 3, the spindle 40 of this embodiment is an elongate, stepped hollow cylindrical member. The spindle 40 is supported in an upper half of the first space 101 and extends in the front-rear direction.

A front half of the spindle 40 defines the tool holder 41. The tool accessory 91 is inserted into an opening 410 of the tool holder 41 at its front end such that the longitudinal axis of the tool accessory 91 coincides with the driving axis DX. When the tool accessory 91 is held by the tool holder 41, the tool accessory 91 is allowed to move in the axial direction relative to the tool holder 41 and restricted from rotating around the longitudinal axis relative to the tool holder 41. A rear half of the spindle 40 defines a cylinder 42 that slidably holds a piston 57. In this embodiment, the spindle 40 is a single component including the tool holder 41 and the cylinder 42 that are integrally formed. However, the spindle 40 may be formed by coupling a plurality of separate (discrete) members.

The spindle 40 is supported by two bearings 401 and 402 to be rotatable around the driving axis DX. The front bearing 401 is fitted into and supported by the front end portion (the barrel part 111) of the first housing part 11 and rotatably supports the front end portion (the tool holder 41) of the spindle 40. The rear bearing 402 is supported by a support body 22 and rotatably supports the rear end portion (the cylinder 42) of the spindle 40.

As shown in FIG. 5, the support body 22 is an annular (ring-like) member as a whole. The support body 22 is made of metal. As shown in FIG. 3, the bearing 402 is fitted into the support body 22. The support body 22 is coupled (attached, fixed) to the front end portion of the upper half of the inner housing 20 and is fitted into the upper portion of the first housing part 11. With this structure, the rear end portion of the spindle 40 is supported by the first housing part 11 via the bearing 402 and the support body 22.

The driving mechanism 4 is now described.

As shown in FIG. 3, the driving mechanism 4 is operably coupled to the motor 31 (the motor shaft 315). The driving mechanism 4 is configured to be driven by the power of the motor 31. The driving mechanism 4 of this embodiment includes a hammer (striking) mechanism 5 that is configured to perform the hammer action and a rotation transmitting mechanism 6 that is configured to perform the rotary action. The hammer mechanism 5 includes a motion converting mechanism 51 and a hammer (striking) element 58.

Figure 6:
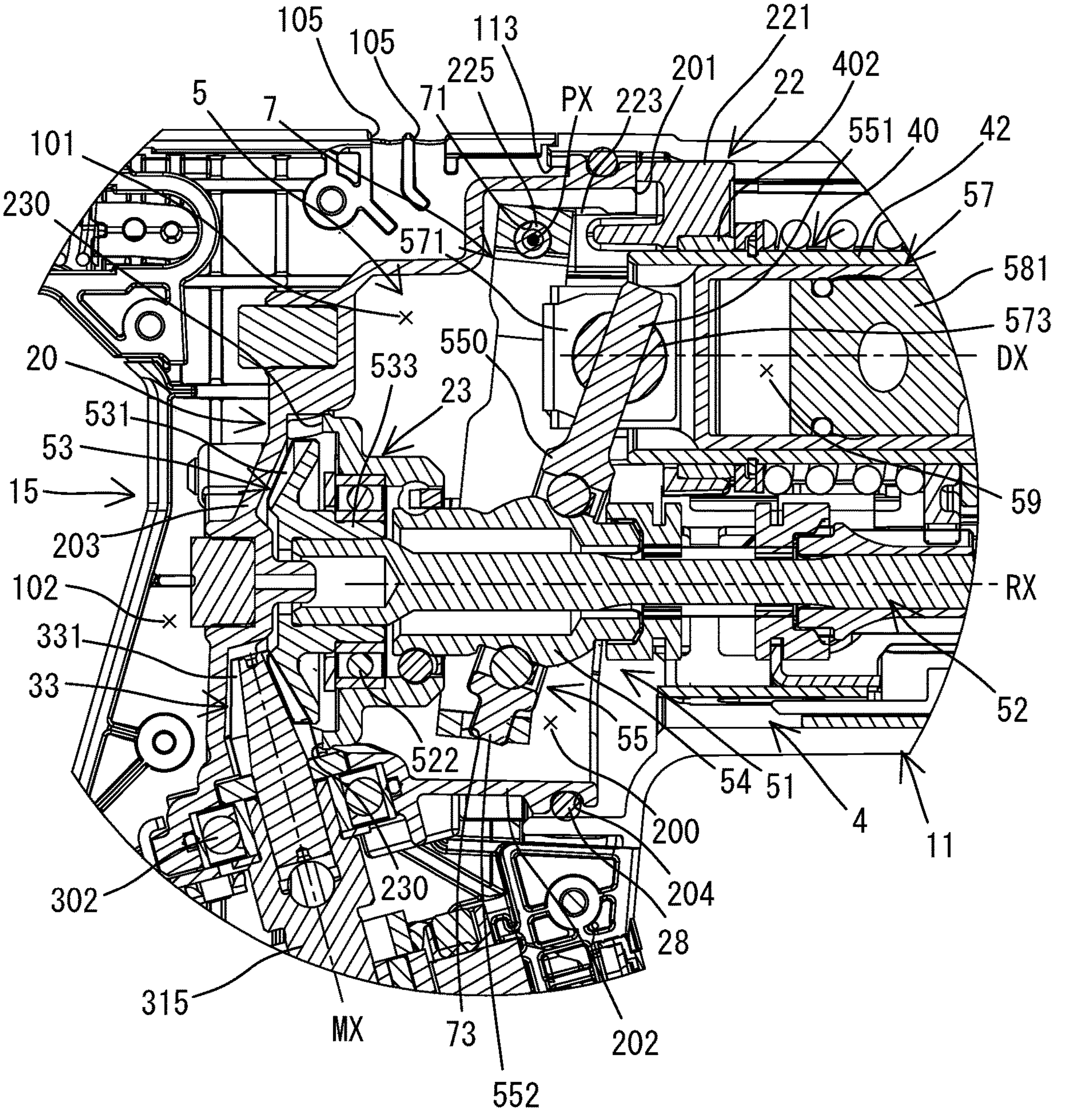
FIG. 6 is another partial, enlarged view of FIG. 2.

As shown in FIGS. 3 and 6, the motion converting mechanism 51 is operably coupled to the motor shaft 315. The motion converting mechanism 51 is configured to convert rotation of the motor shaft 315 into linear motion along the driving axis DX (specifically, linear motion of the piston 57) for driving the tool accessory 91. In this embodiment, the motion converting mechanism 51 is of an oscillating type (pivot type). The motion converting mechanism 51 includes a rotary member 54 and an oscillating member 55 that are disposed on (around) an intermediate shaft 52, and the piston 57 that is disposed within the spindle 40 (the cylinder 42).

The intermediate shaft 52 is disposed in the lower half of the first space 101. The intermediate shaft 52 is supported to be rotatable around a rotational axis RX that is parallel to the driving axis DX. The rotational axis RX thus extends in the front-rear direction. A second bevel gear 53 is fixedly coupled to a rear end portion of the intermediate shaft 52. The second bevel gear 53 is configured to be rotated integrally with the intermediate shaft 52.

The second bevel gear 53 includes a cylindrical mount part 533 and a teeth part having gear teeth 531. The mount part 533 is fixed around (onto an outer periphery of) the rear end portion of the intermediate shaft 52. A rear end of the second bevel gear 53 (a rear end of the teeth part) is rearward of the rear end of the intermediate shaft 52. Thus, a portion of the second bevel gear 53 protrudes rearward from the rear end of the intermediate shaft 52. The second bevel gear 53 meshes with the first bevel gear 33 that is fixed on the motor shaft 315, and configured to be rotated integrally with the intermediate shaft 52 when the motor shaft 315 is rotated. The first bevel gear 33 and the second bevel gear 53 form a gear speed reducer. Thus, the gear teeth 531 of the second bevel gear 53 has a diameter that is larger than that of the gear teeth 331 of the first bevel gear 33.

The intermediate shaft 32 is rotatably supported by two bearings 521 and 522. The front bearing 521 is fitted around the front end portion of the intermediate shaft 52. The bearing 521 is supported by the front end portion of the body housing 10 (the first housing part 11). The rear bearing 522 is fitted around the mount part 533 of the second bevel gear 53. The bearing 522 is supported by a bearing support 23 that is fixed to the inner housing 20. Thus, in this embodiment, the rear end portion of the intermediate shaft 52 is rotatably supported via the second bevel gear 53. Owing to such a structure, the intermediate shaft 52 can be made shorter, compared to a known structure in which a portion of the intermediate shaft 52 is directly supported by a bearing.

The bearing support 23 is originally separate (discrete) from the inner housing 20. The bearing support 23 is disposed within the inner housing 20 and is fixed to the inner housing 20 using screws. The bearing support 23 is configured to cover a peripheral portion of the teeth part and a front end portion of the second bevel gear 53. The second bevel gear 53 is housed in a space that is defined between the rear wall part 203 of the inner housing 20 and the bearing support 23. The bearing support 23 has openings 230 that are formed radially outward of the gear teeth 531 of the second bevel gear 53. The openings 230 each communicate with an outer space of the bearing support 23 and an internal space of the bearing support 23 in which the second bevel gear 53 is disposed.

The rotary member 54 is disposed on (around) the intermediate shaft 52 and is configured to be rotate integrally with the intermediate shaft 52. Although not described in detail because it is a well-known structure, a state of the rotary member 54 is changed between a first state and a second state by a mode changing mechanism according to a selected action mode. In the first state, the rotary member 54 rotates integrally with the intermediate shaft 52. In the second state, the rotary member 54 idly rotates relative to the intermediate shaft 52. The rotary member 54 rotates integrally with the intermediate shaft 52 in the first state only when the action mode for performing the hammer action is selected. The oscillating member 55 is operably coupled to the rotary member 54. The oscillating member 55 is configured to be oscillated (pivoted) while the rotary member 54 rotates. The rotary member 54 and the oscillating member 55 are well-known components that may also be collectively called a swash bearing or a wobble bearing.

The oscillating member 55 of this embodiment includes an annular ring part 550, an oscillating arm 551 and a protrusion 552. The ring part 550 is mounted around the rotary member 54 via rolling elements (e.g., balls). The oscillating arm 551 and the protrusion 552 each protrude radially outward from the ring part 550. More specifically, the oscillating arm 551 protrudes upward from the ring part 550 in the up-down direction and is configured to be oscillated in the front-rear direction while the rotary member 54 rotates. The oscillating arm 551 is operably coupled to the piston 57. The protrusion 552 is coaxial with (extends along) a longitudinal axis of the oscillating arm 551 and protrudes from the ring part 550 in a direction opposite to the oscillating arm 551. Thus, the protrusion 552 is oscillated opposite to the oscillating arm 551 in the front-rear direction while the rotary member 54 rotates. The protrusion 552 is coupled to a counterweight 7. The counterweight 7 and a supporting structure thereof will be described in detail later.

The piston 52 is a cylindrical member having a bottom and is disposed within the cylinder 42 (the rear half of the spindle 40) to be slidable along the driving axis DX. A rear end portion 571 of the piston 57 is operably coupled to the oscillating arm 551 of the oscillating member 55 via a coupling pin 573. The piston 57 is configured to be reciprocated in the front-rear direction while the oscillating arm 551 of the oscillating member 55 is oscillated.

The inner housing 20 of this embodiment is configured to house a portion of the motion converting mechanism 51 of the hammer mechanism 5. More specifically, the inner housing 20 is configured such that the most part of the rotary member 54 and the oscillating member 55 that are disposed on the intermediate shaft 52 is accommodated in the internal space 200 of the inner housing 20. In other words, the most part of the rotary member 54 and the oscillating member 55 is surrounded by the peripheral wall part 202 and the rear wall part 203 of the inner housing 20.

As shown in FIG. 3, the hammer element 58 is configured to linearly move in response to the reciprocation of the piston 57 and to strike the tool accessory 91, so as to linearly drive the tool accessory 91 along the driving axis DX. In this embodiment, the hammer element 58 includes a striker 581 and an impact bolt 583. The striker 581 is disposed within the piston 57 to be slidable along the driving axis DX. An internal space of the piston 57 behind the striker 581 (a space between the striker 581 and the bottom of the piston 57) is configured as an air chamber 59 that serves as an air spring. The impact bolt 583 is disposed in front of the striker 581 within the tool holder 41 to be slidable along the driving axis DX. A space in front of the striker 581 communicates with the first space 101 via at least one through hole formed in the tool holder 41.

When the piston 57 reciprocates within the cylinder 42, the pressure of the air in the air chamber 59 fluctuates. Consequently, the striker 581 slides within the piston 57 in the front-rear direction, owing to the effect of the air spring. More specifically, when the piston 57 is moved forward, the striker 581 is pushed forward at high speed, owing to the effect of the air spring, so as to strike the impact bolt 583. The impact bolt 583 transmits the kinetic energy of the striker 581 to the tool accessory 91. Thus, the tool accessory 91 is linearly driven forward along the driving axis DX. When the piston 57 is moved rearward, the striker 581 is pulled rearward. Since the tool accessory 91 is pressed against a workpiece, the tool accessory 91 moves rearward together with the impact bolt 583. In this manner, the hammer action is repeated by the hammer mechanism 5.

As shown in FIG. 3, the rotation transmitting mechanism 6 is operably coupled to the motor shaft 315 and is configured to transmit the rotation of the motor shaft 315 to the tool holder 41 (the spindle 40). The rotation transmitting mechanism 6 includes a driving gear 61 that is disposed on the front end portion of the intermediate shaft 52, and a driven gear 63 that is fixed around the cylinder 42 of the spindle 40 so as to mesh with the driving gear 61. The driving gear 61 and the driven gear 63 form a gear speed reducer. A state of the driving gear 61 is changed between a first state and a second state by the above-described mode changing mechanism. In the first state, the driving gear 61 rotates integrally with the intermediate shaft 52. In the second state, the driving gear 61 idly rotates relative to the intermediate shaft 52. The driving gear 61 rotates integrally with the intermediate shaft 52 in the first state only when the action mode for performing the rotary action is selected.

When the driving gear 61 is rotated integrally with the intermediate shaft 52 in response to the rotation of the motor shaft 315, the spindle 40 is rotated integrally with the driven gear 63, and thereby the tool accessory 91 that is held by the tool holder 41 is rotationally driven around the driving axis DX. In this manner, the rotary action is performed by the rotation transmitting mechanism 6.

The counterweight 7 and the supporting structure of the counterweight 7 are now described.

Figure 7:
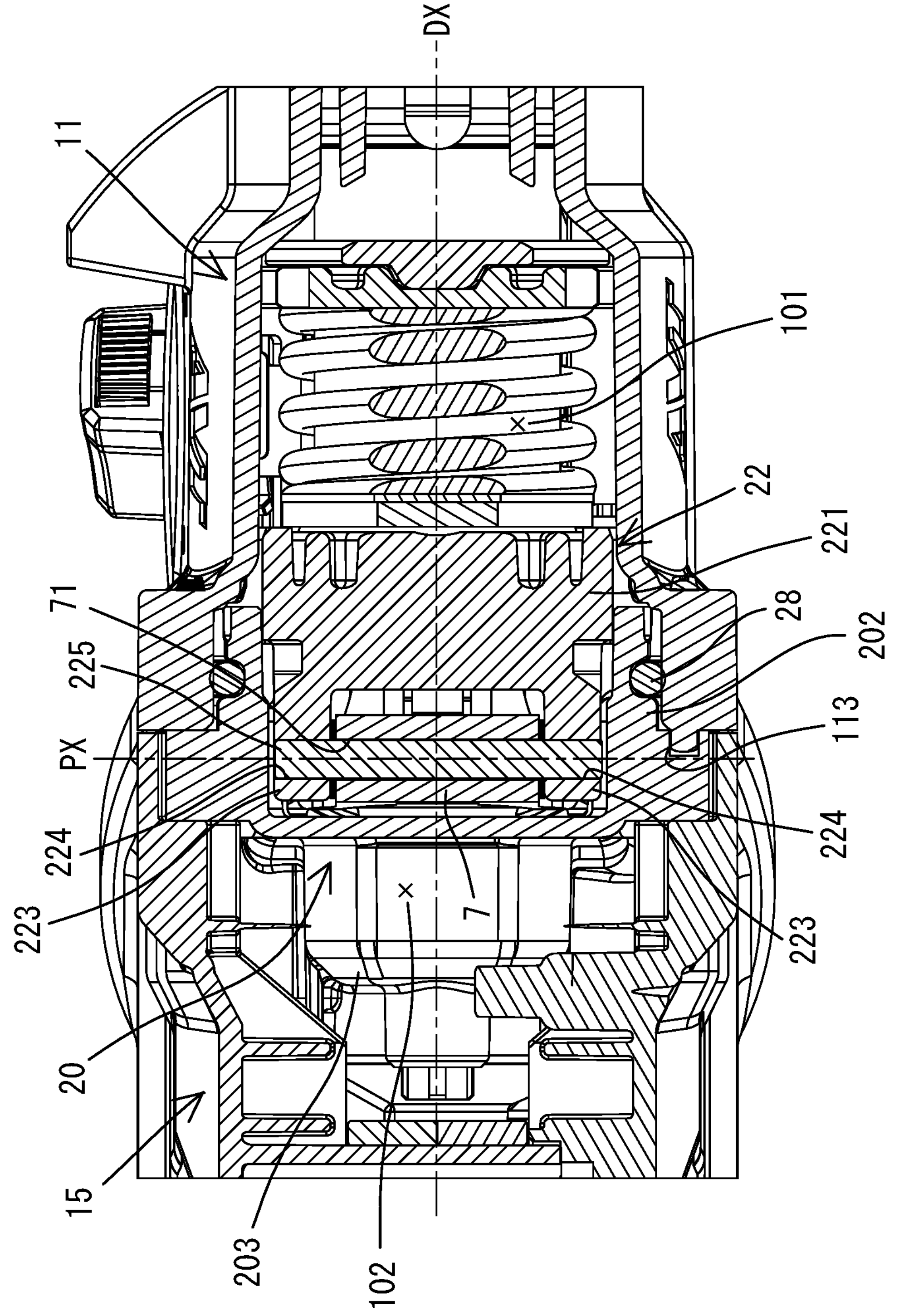
FIG. 7 is a sectional view taken along line VII-VII in FIG. 3.

As shown in FIGS. 6 and 7, the counterweight 7 is supported by the support body 22 to be pivotable (to be oscillated) in the first space 101, which is surrounded by the first housing part 11 and the inner housing 20. As described above, the support body 22 is a member (part, component) that is originally separate (discrete) from the inner housing 20 and is coupled to the front end portion of the upper half of the inner housing 20.

Figure 8:
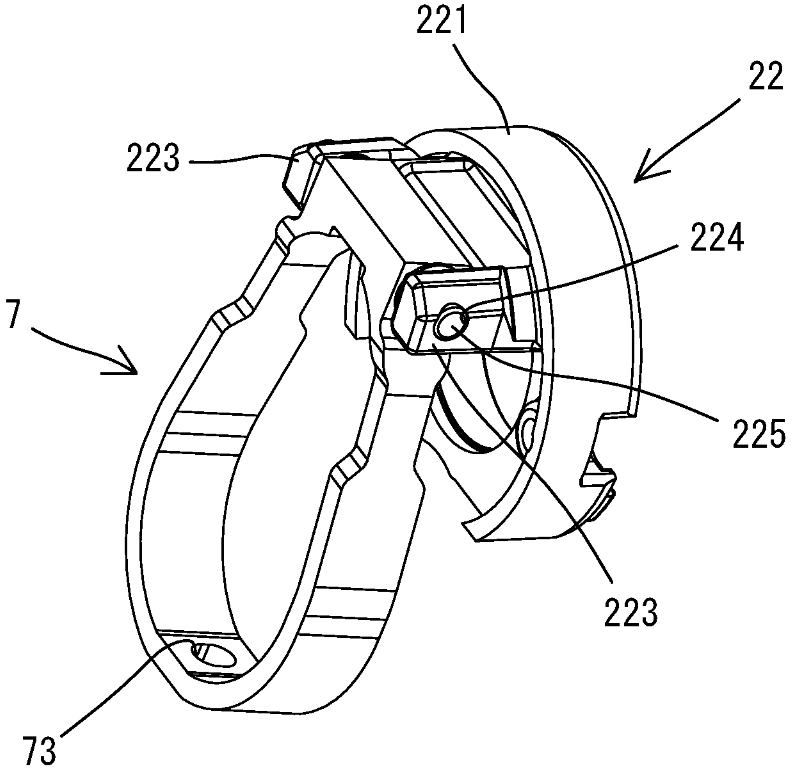
FIG. 8 is a perspective view of a counterweight that is supported by the support body.
Figure 9:
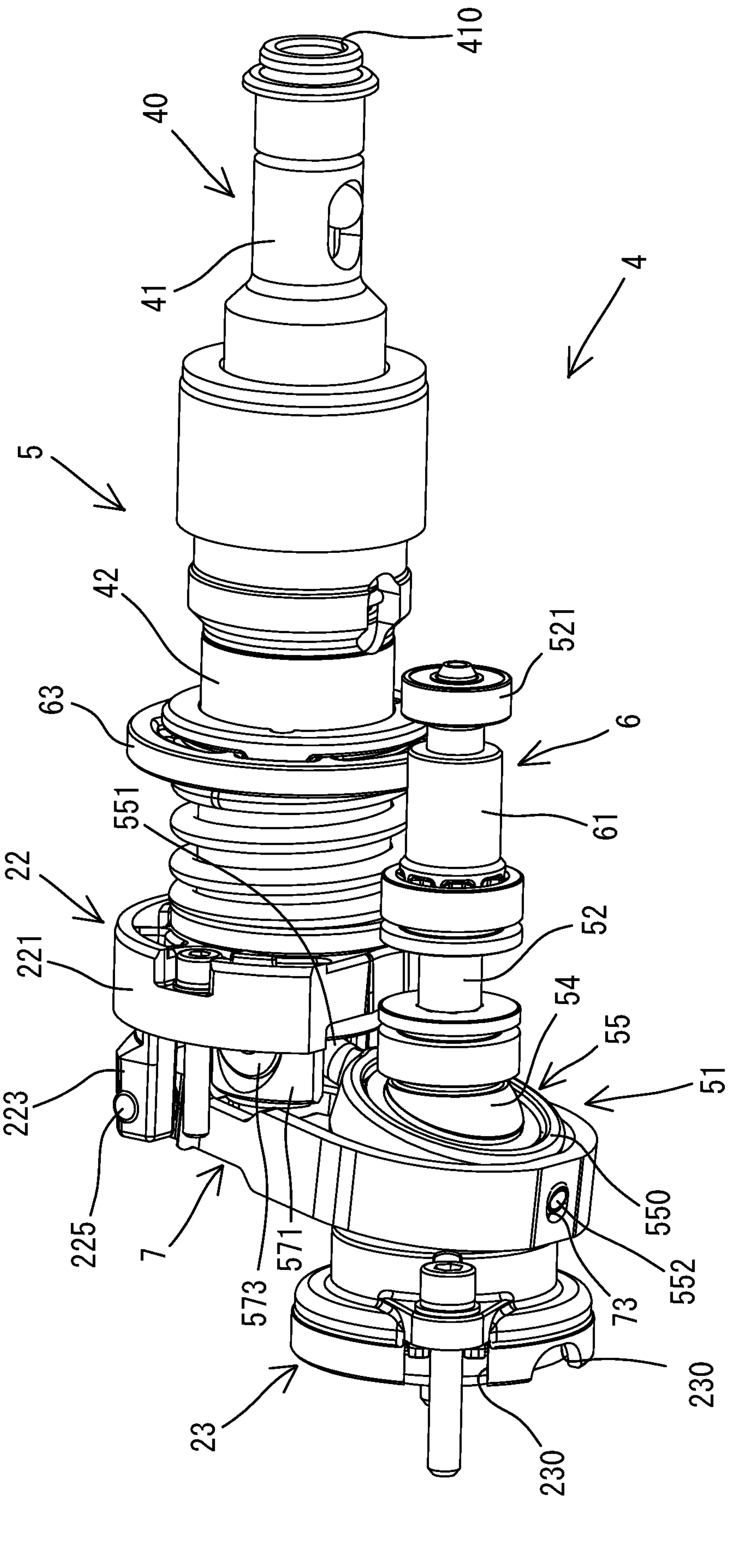
FIG. 9 is a perspective view of the driving mechanism to which the support body and the counterweight are mounted.

More specifically, as shown in FIGS. 8 and 9, the counterweight 7 of this embodiment is an annular (ring-like) member that is elongate in the up-down direction. The counterweight 7 is made of metal. The support body 22 includes an annular main body 221 and two arm parts 223 each protruding rearward from an upper portion of the main body 221.

The main body 221 supports the rear end portion of the spindle 40 (the cylinder 42) via the bearing 402, as described above (see FIG. 6). The main body 221 is fixed to the front end portion of the inner housing 20 using screws, such that a contact surface that is defined at a rear end of the main body 221 is in contact with a contact surface that is defined on the front end portion of the inner housing 20. The main body 221 is above the rotary member 54, which is disposed on the intermediate shaft 52, in the up-down direction.

Each of the two arm parts 223 extends from a portion of the main body 221 above the rear end portion 571 of the piston 57 (i.e., a portion coupled to the oscillating arm 551) into the internal space 200 of the inner housing 20. The arm parts 223 are spaced apart from each other in the left-right direction and at substantially the same location in the up-down direction. The arm parts 23 extend in the front-rear direction to be in substantially parallel to each other. A rear end of each of the arm parts 223 is directly above the rotary member 54 and the ring part 550 of the oscillating member 55.

As shown in FIGS. 6 and 7, a support hole 71 penetrates (extends) in the left-right direction through an upper end portion of the counterweight 7. A support shaft 225 is inserted into the support hole 71. The rear end portions of the two arm parts 223 of the support body 22 support opposite axial end portions of the support shaft 225, respectively. More specifically, a support hole 224 penetrates (extends) in the left-right direction through the rear end portion of each of the arm parts 223. The axial end portions of the support shaft 225 are respectively inserted into the support holes 224 of the two arm parts 223 and are thus supported by the two arm parts 223. The counterweight 7 is pivotably supported by the support body 22 via the support shaft 225 in this manner. The pivot axis PX of the counterweight 7 extends in the left-right direction above the rear end portion 571 of the piston 57.

An inner region of the ring part of the counterweight 7 includes an upper half and a lower half in the up-down direction. The upper half of the inner region is located at a position corresponding to the rear end portion 571 of the piston 57. The lower half of the inner region is located at a position corresponding to the ring part 550 of the oscillating member 55. The counterweight 7 is designed such that the rear end portion 571 of the piston 57 and the ring part 550 of the oscillating member 55 are movable within the inner region without interfering with the counterweight 7 during the hammer action.

Further, as shown in FIGS. 6 and 9, the counterweight 7 is operably coupled to the oscillating member 55. More specifically, an engagement hole 73 is formed in the lower end portion of the counterweight 7. The protrusion 552 of the oscillating member 55 is loosely inserted into the engagement hole 73. Thus, when the oscillating member 55 is oscillated in response to the rotation of the intermediate shaft 52, the counterweight 7 is driven by the protrusion 552 to be pivoted (oscillated) around the pivot axis PX. As described above, the protrusion 552 is coaxial with the oscillating arm 551 and protrudes in the opposite direction from the oscillating arm 551. Therefore, the lower end portion of the counterweight 7 moves opposite to the piston 57 and the hammer element 58. Thus, the counterweight 7 can reduce periodic vibration in the front-rear direction that is caused during the hammer action.

As described above, in this embodiment, the counterweight 7 is supported, not by the inner housing 20, but by the support body 22, which is a member that is originally separate (discrete) from the inner housing 20. Thus, the inner housing 20 can be optimally designed, without any constraints of the supporting structure of the counterweight 7. For example, compared to a known structure in which a counterweight is directly supported by an inner housing itself, the shape of the inner housing 20 can be simplified. Further, the arm parts 223 can be easily placed in the support body 22, which is advantageous in processing cost of the supporting structure. In this embodiment, the support body 22 not only supports the counterweight 7, but also supports the rear end portion of the spindle 40. Thus, a rational supporting structure of the counterweight 7 and the spindle 40 can be achieved without increasing the number of parts or components.

Further, in the above-described known structure, a part or component (a support part) that supports the counterweight via a support shaft protrudes frontward from a peripheral wall part of the inner housing. This is because the support shaft needs to be inserted into a support hole or support holes of the supporting part in assembling. The support part and counterweight, as well as the driving mechanism and lubricant, are disposed in a space sealed by a seal member mounted around the peripheral wall part of the inner housing. However, since the counterweight needs to be driven by an oscillating member, the support shaft cannot be spaced apart frontward from the oscillating member beyond a certain limit. Thus, in the above-described known structure, there is a limit to how far the peripheral wall part of the inner housing can be extended frontward so that the seal member is positioned further frontward.

In contrast, in this embodiment, the support body 22 supports the support shaft 225 in the internal space 200 of the inner housing 20. Accordingly, there is no such a limit, and thus the inner housing 20 can be extended further frontward, compared to the known structure and the seal member 28 can be disposed in the front end portion of the inner housing 20. Consequently, the air that flows within the second space 102 along the above-described air passage can effectively cool a wider range of the inner housing 20.

A structure for adjusting the pressure of air in the first space 101 is now described.

As described above, the lubricant is in the first space 101 that is defined by the inner housing 20 and the first housing part 11. The first space 101 is thus configured as a closed space, in order to restrict a leakage of the lubricant. On the other hand, if the first space 101 is made to be an air-tight space, the hammer element 58 may malfunction (may not operate properly). Specifically, when heat is generated due to driving of the hammer mechanism 5, the temperature and the pressure of the air in the first space 101 increase, and the pressure of the air in the space in front of the striker 581 within the spindle 40 also increases. Such a situation may lead to an imbalance between the pressure in the space in front of the striker 581 and the pressure in the air chamber 59, which serves as an air spring, and thus the striker 581 may fail to properly operate in linear motion.

Figure 10:
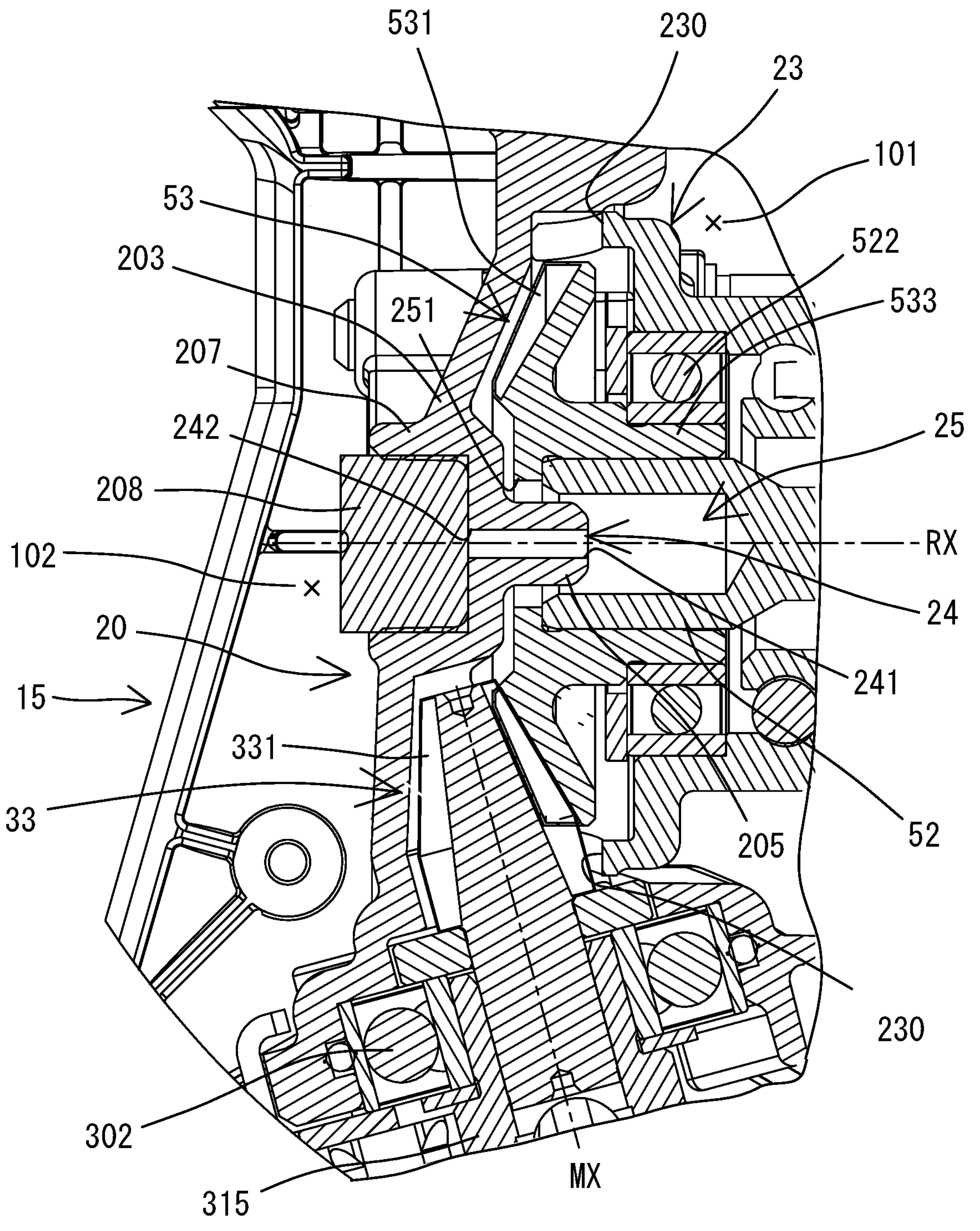
FIG. 10 is yet another partial, enlarged view of FIG. 2.

In order to prevent such malfunction, the rotary hammer 1 of this embodiment has a structure that is configured to adjust the pressure in the first space 101 by allowing the air in the first space 101 to flow out of the first space 101 and flows into the second space 102. Specifically, as shown in FIG. 10, the inner housing 20 has an air ventilation hole (air ventilation passage) 24 that communicates with an inside and an outside of the first space 101. However, it is not favorable that the lubricant leaks out of the first space 101 through the air ventilation hole 24. For this reason, in this embodiment, the air ventilation hole 24 and a vicinity of the air ventilation hole 24 are configured to restrict a leakage of the lubricant.

The air ventilation hole 24 is formed in the rear wall part 203 of the inner housing 20 at a position corresponding to a central portion of the second bevel gear 53 that is fixed to the intermediate shaft 52. More specifically, a protrusion 205 protrudes frontward from a portion of the rear wall part 203 of the inner housing 20 that corresponds to (faces) a region that is radially inward of the inner periphery (the radially inner edge) of the gear teeth 531 of the second bevel gear 53. The air ventilation hole 24 is a through hole that linearly penetrates (extends) through the protrusion 205 in the front-rear direction along the rotational axis RX of the second bevel gear 53. The air ventilation hole 24 includes an inlet opening 241, which faces the inside of the inner housing 20, and an outlet opening 242, which faces the outside of the inner housing 20.

A recess (a hole with a bottom) 25 that is configured to receive the protrusion 205 of the inner housing 20 is formed in the second bevel gear 53 and the intermediate shaft 52. As described above, the second bevel gear 53 is fixed onto the outer periphery of the intermediate shaft 52 such that the rear end portion of the second bevel gear 53 protrudes rearward from the rear end of the intermediate shaft 52. The recess 25 has an opening 251 on a rear end surface of the second bevel gear 53, penetrates through the central portion of the teeth part of the second bevel gear 53, and extends frontward into the central portion of the intermediate shaft 52. The diameter of the recess 25 is larger than the diameter of the protrusion 205. The protrusion 205 is inserted into the recess 25 through the opening 251 with a gap between an outer surface of the protrusion 205 and a surface that defines the recess 25 (i.e., such that the protrusion 205 is spaced apart from the surface that defines the recess 25). A distal end of the protrusion 205 and thus the inlet opening 241 of the air ventilation hole 24) is spaced apart rearward from a bottom surface of the recess 25. The air ventilation hole 24 communicates with an internal space of the recess 25.

Such a structure defines an air passage that extends from the opening 251, passes through the inside of the recess 25, and reaches the outside of the inner housing 20 by way of the air ventilation hole 24. Thus, this air passage is configured such that the air needs to turn (i.e., a direction of an air flow is reversed) in the middle of the air passage.

The recess 25 of this embodiment is formed by a through hole that penetrates (extends through) the central portion of the teeth part of the second bevel gear 53 and a recess (a hole with a bottom) that communicates with the through hole of the second bevel gear 53 and that is recessed frontward from the rear end surface of the intermediate shaft 52. The diameter of the through hole of the second bevel gear 53 is larger than the diameter of the recess of the intermediate shaft 52, so that the protrusion 205 can be easily inserted into the recess 25 in assembling.

As shown in FIGS. 4 and 10, a tubular part 207 is provided on the outer surface of the rear wall part 203 of the inner housing 20. The tubular part 207 encircles the air ventilation hole 24. A filter 208 is fitted into the tubular part 207. The filter 208 is formed by any member that allows air to pass therethrough while absorbs and retains the lubricant therein. For example, felt or sponge may be employed for the filter 208.

A portion of the rear wall part 203 of the inner housing 20 that faces the gear teeth 531 of the second bevel gear 53 has a shape that conforms to the shape of the teeth part. A distance between an inner surface of the portion of the inner housing 20 that faces the gear teeth 531 and tips of the gear teeth 531 is smaller than a tooth depth of the gear teeth 531 (a distance between a tooth tip and a tooth root at an outer peripheral edge of the gear teeth 531). Thus, the distance between the tips of the gear teeth 531 and the inner housing 20 is extremely small. This configuration can limit an amount of the lubricant that enters the gap between the tips of the gear teeth 531 and the inner housing 20. Further, the distance between the tips of the gear teeth 531 and the inner housing 20 is substantially uniform in the radial direction of the second bevel gear 53.

Similarly, a distance between an inner surface of a portion of the inner housing 20 that faces the gear teeth 331 of the first bevel gear 33 and tips of the gear teeth 331 is smaller than a tooth depth of the gear teeth 331 (a distance between a tooth tip and a tooth root at an outer peripheral edge of the gear teeth 331). Thus, the distance between the tips of the gear teeth 331 and the inner housing 20 is extremely small. Further, the distance between the tips of the gear teeth 331 and the inner housing 20 is substantially uniform in the radial direction of the first bevel gear 33.

In this embodiment, the bearing 522 that supports the rear end portion of the intermediate shaft 52 is supported, not directly by the rear wall part 203, but by the bearing support 23 that is fixed to the inner housing 20 within the inner housing 20. Therefore, as described above, the rear wall part 203 of the inner housing 20 can be designed to have an appropriate shape such that the lubricant cannot easily pass through the air passage.

When the hammer mechanism 5 generates heat during the driving of the hammer mechanism 5, the air in the first space 101 expands to increase the pressure in the first space 101. When this happens, the air in the first space 101 flows out through the air ventilation hole 24 into the second space 102, in which the pressure is lower. Specifically, the air enters the bearing support 23 (a space between the bearing 522 and the rear wall part 203) mainly through the openings 230 from the outside of the bearing support 23. This air passes through the gap between the second bevel gear 53 and the inner surface of the inner housing 20 and the gap between the first bevel gear 33 and the inner surface of the inner housing 20, and reaches the opening 251 of the recess 25. The air that flows into the recess 25 via the opening 251 flows frontward through the gap between the outer surface of the protrusion 205 and the surface that defines the recess 25, flows into the air ventilation hole 24 via the inlet opening 241, and flows out into the second space 102 via the outlet opening 242 and the filter 208.

On the other hand, a possibility of leakage of the lubricant from the first space 101 into the second space 102 can be effectively reduced. Specifically, during the driving of the hammer mechanism 5, the second bevel gear 53 is rotated, so that the lubricant between the gear teeth 531 of the second bevel gear 53 and the inner surface of the inner housing 20 is delivered (fed) radially outward by the centrifugal force. The lubricant can flow out of the bearing support 23 through the openings 203 of the bearing support 23. In this manner, the second bevel gear 53, which is a part of the driving mechanism 4, is utilized to reduce a possibility that the lubricant reaches the opening 251 of the recess 25 that is provided at the central portion of the second bevel gear 53 to communicate with the air ventilation hole 24. The second bevel gear 53 has a larger diameter than the first bevel gear 33. Therefore, a passage from the outer peripheral edge (the radially outer edge) to the central portion of the gear teeth 531 can be made longer, compared to a passage from an outer peripheral edge (the radially outer edge) to a central portion of the gear teeth 331. Further, the recess 25 that receives the protrusion 205 can be formed easily. Thus, there is an advantage to utilize the second bevel gear 53 to form the effective air passage.

In addition, as described above, the passage from the opening 251 of the recess 25 to the outlet opening 242 of the air ventilation hole 24 first extends frontward and then turns to extend rearward. This configuration can further reduce the possibility of the leakage of the lubricant. Further, even if the lubricant leaks out from the outlet opening 242 of the air ventilation hole 24, the filter 208 that is fitted in the tubular part 207 absorbs and retains the lubricant, which reduces a possibility that the lubricant spreads in the second space 102.

The above-described embodiment is merely exemplary, and the reciprocating tool according to the present disclosure is not limited to the rotary hammer 1 of the above-described embodiment. For example, the following non-limiting modifications may be made. Further, at least one of these modifications may be employed in combination with at least one of the rotary hammer 1 of the above-described embodiment and the claimed features.

For example, the reciprocating tool according to the present disclosure may be embodied as a power tool having a hammer mechanism that is configured to perform only the hammer action (e.g., an electric hammer (a demolition hammer or a scraper)), or as a reciprocating cutting tool that is configured to reciprocate a tool accessory (for example, a blade) to perform a cutting operation.

The structures and/or arrangements of the body housing, the inner housing, the motor, and the driving mechanism for the tool accessory in the reciprocating tool according to the present disclosure may be appropriately changed from those in the above-described embodiment. For example, the motor may be disposed such that the motor axis extends in parallel to the driving axis.

The counterweight according the present disclosure need not necessarily have an annular shape. For example, the counterweight may have a U-shape. The counterweight of this modification may be supported by the support body 22 via the support shaft 225 that is inserted into support holes formed in two end portions of the U-shaped counterweight. In another modification, a support shaft may be integrally formed with the counterweight and may be pivotably supported by the support body 22. The counterweight and the oscillating member of the motion converting mechanism according to the present disclosure may be operably coupled to each other at a position different from that of the above-described embodiment.

The support body according to the present disclosure need not necessarily support the tool accessory holding member (the spindle 40). Instead, the support body may only serve to support the counterweight. The shape of the support body (e.g., the shape of the main body 221 and/or the shape and/or the number of the arm parts 223) may be appropriately changed. Further, the support body may be attached (fixed) to the inner housing in a state in which an entirety of the support body is within the inner housing.

Further, in view of the nature of the present invention, the above-described embodiment, and the modifications thereof, the following Aspects A1 to A8 can be provided. Any one or more of the following Aspects A1 to A8 can be employed in combination with any one or more of the above-described embodiments, the above-described modifications, and the claimed features.

Aspect A1

The inner housing is fitted into a portion of the body housing from the rear side.

Aspect A2

The inner housing is a hollow body that has an open front end, a closed circumference around the driving axis, and a closed rear end.

Aspect A3

The support shaft is between a front end and a rear end of the inner housing in the front-rear direction.

Aspect A4

An entirety of the counterweight is between a front end and a rear end of the inner housing in the front-rear direction (i.e., an entirety of the counterweight is within the inner housing).

Aspect A5

A portion of the support body is forward of the inner housing in the front-rear direction.

Aspect A6

At least a portion of the inner housing is forward of the air inlet opening in the front-rear direction, the body housing includes a guide rib that is configured to guide the air that flows into the body housing through the air inlet opening, and the guide rib is adjacent to the air inlet opening and is at least partially inclined frontward as the guide rib extends away from the air inlet opening.

Aspect A7

The motion converting mechanism includes:

a rotary member that is disposed around the intermediate shaft and is configured to rotate integrally with the intermediate shaft, an oscillating member that is operably coupled to the rotary member and is configured to oscillate in an extension direction of the driving axis in response to rotation of the rotary member, and a piston that is operably coupled to the oscillating member and is configured to reciprocate along the driving axis within the tool accessory holding member.

Aspect A8

The motion converting mechanism includes:

a rotary member that is disposed around the intermediate shaft and is configured to rotate integrally with the intermediate shaft, and an oscillating member that is operably coupled to the rotary member and is configured to oscillate in an extension direction of the driving axis in response to rotation of the rotary member, wherein the counterweight is operably coupled to the oscillating member.

The following Aspects B1 to B13 can be provided for another non-limiting object to provide a power tool having an improved structure for ventilating air from a housing space of a hammer (striking) mechanism that utilizes an air spring. Any one of the following Aspects B1 to B13 can be employed alone or two or more of them can be employed in combination with each other. Alternatively, any one or more of the following Aspects B1 to B13 can be employed in combination with any one of the rotary hammer 1 of the above-described embodiment, the above-described modifications, the above-described Aspects A1 to A8, and the claimed features.

Aspect B1

A power tool comprising:

a motor that has a motor shaft to which a first bevel gear is fixed;

a hammer mechanism that (i) is operably coupled to the motor shaft via a second bevel gear that meshes with the first bevel gear, and (ii) is configured to linearly drive a tool accessory along a driving axis using an action of an air spring;

a body housing that houses the motor and the hammer mechanism; and an inner housing that is within the body housing, wherein:

a closed housing space is defined within the body housing, the hammer mechanism and lubricant are in the housing space, the inner housing defines at least a portion of the housing space, the inner housing has an air ventilation hole (air ventilation passage), the air ventilation hole has an inlet opening that faces an inside of the inner housing and an outlet opening that faces an outside of the inner housing, and the inlet opening of the air ventilation hole is radially inward of a radially inner edge (an inner peripheral edge) of gear teeth of a first one of the first bevel gear and the second bevel gear.

In the power tool of this aspect, the hammer mechanism and the lubricant are accommodated in the housing space that is defined within the body housing. The housing space is a closed space that is at least partially defined by the inner housing, and air is allowed to flow in and out of the housing space through the air ventilation hole of the inner housing. Owing to this structure, when the internal pressure of the housing space is increased due to heat generation caused by driving of the hammer mechanism, the air flows out of the housing space through the air ventilation hole. Consequently, the internal pressure of the housing space is adjusted and a possibility that the air spring does not properly operate can be reduced.

Further, the inlet opening of the air ventilation hole is radially inward of (at the radially inner side of) the radially inner edge of the gear teeth of the first one of the first bevel gear and the second bevel gear. Owing to this structure, when the hammer mechanism is driven and thus the first one of the first bevel gear and the second bevel gear is rotated, the lubricant cannot easily reach the inlet opening of the air ventilation hole. The first bevel gear and the second bevel gear are components that are used to transmit power from the motor to the hammer mechanism. Thus, by utilizing the first bevel gear or the second bevel gear, the structure of this aspect can effectively reduce the possibility of leakage of the lubricant without increasing the number of components.

Aspect B2

The power tool as defined in Aspect B1, wherein the inlet opening of the air ventilation hole is radially inward of the radially inner edge of the gear teeth of the second bevel gear.

According to this aspect, the air ventilation hole is relatively easily formed in the inner housing. Generally, in order to reduce rotation speed, the diameter of the second bevel gear is larger than the diameter of the first bevel gear. Thus, in such a case, by providing the air ventilation hole that corresponds to the second bevel gear, a passage from the radially outside of the second bevel gear to the inlet opening of the air ventilation hole can be made longer than a structure in which the air ventilation hole corresponds to the first bevel gear. Therefore, in a case in which the second bevel gear has a larger diameter than the first bevel gear, it is preferable that the position of the air ventilation hole is determined, corresponding to the second bevel gear.

Aspect B3

The power tool as defined in Aspect B2, wherein a rotational axis of the second bevel gear extends through the inlet opening of the air ventilation hole.

According to this aspect, the inlet opening can be disposed at a position where it is most difficult for the lubricant to reach.

Aspect B4

The power tool as defined in Aspect B2 or B3, further comprising:

an intermediate shaft that is operably coupled to the motor shaft and is rotatable around a rotational axis that extends in parallel to the driving axis, wherein:

the hammer mechanism includes a motion converting mechanism that (i) is partially disposed on the intermediate shaft and (ii) is configured to convert rotation of the intermediate shaft into linear motion in an extension direction of the driving axis for driving the tool accessory, and the second bevel gear is fixed to the intermediate shaft.

According to this aspect, the possibility of leakage of the lubricant can be effectively reduced, utilizing the second bevel gear fixed to the intermediate shaft on which a portion of the motion converting mechanism is disposed.

Aspect B5

The power tool as defined in Aspect B4, further comprising:

a bearing that is supported by the inner housing and rotatably supports the second bevel gear, wherein the intermediate shaft is rotatably supported via the second bevel gear.

According to this aspect, the intermediate shaft can be made shorter, compared to a structure in which a portion of the intermediate shaft is directly supported by the bearing.

Aspect B6

The power tool as defined in any one of Aspects B1 to B5, wherein:

the inner housing has a protrusion that protrudes toward the first one of the first bevel gear and the second bevel gear, the air ventilation hole penetrates the protrusion, the inlet opening is at a distal end of the protrusion, and the protrusion extends to at least an inside of the first one of the first bevel gear and the second bevel gear in an axial direction of the first one of the first bevel gear and the second bevel gear.

According to this Aspect, a passage is formed that extends from an axial end of the first one of the first bevel gear and the second bevel gear to the inlet opening of the air ventilation hole. Therefore, the air that has passed the passage needs to turn (i.e., needs to change its proceeding direction) to enter the air ventilation hole. Accordingly, the possibility of leakage of the lubricant can be further reliably reduced.

Aspect B7

The power tool as defined in Aspect B6, further comprising:

a rotary shaft that is rotatable around an axis that extends in the front-rear direction of the power tool, wherein:

the second bevel gear is fixed to a rear end portion of the rotary shaft, a rear end of the second bevel gear is rearward of a rear end of the rotary shaft, and the protrusion protrudes frontward from the inner housing into an inside of the rotary shaft.

According to this aspect, the passage penetrates through the second bevel gear, extends into the inside of the rotary shaft and to the inlet opening of the air ventilation hole. Thus, for example, a portion of the passage in the second bevel gear and a portion of the passage in the rotary shaft can be designed, independent of each other.

Aspect B8

The power tool as defined in any one of Aspects B1 to B7, wherein a distance between an inner surface of the inner housing and tips of the gear teeth of the first one of the first bevel gear and the second bevel gear is smaller than a tooth depth of the gear teeth.

Aspect B9

The power tool as defined in Aspect B8, wherein the distance between the inner surface of the inner housing and the tips of the gear teeth of the first one of the first bevel gear and the second bevel gear is substantially uniform.

These aspects can make it more difficult for the lubricant to pass through between the inner surface of the inner housing and the tips of the gear teeth of the first one of the first bevel gear and the second bevel gear.

Aspect B10

The second bevel gear has a larger diameter than the first bevel gear.

Aspect B11

The first bevel gear is disposed in the housing space.

Aspect B12

At least one of the second bevel gear and the intermediate shaft has a recess that extends along the rotational axis of the intermediate shaft, the protrusion of the inner housing protrudes into the recess, and the air ventilation hole communicates with an internal space of the recess.

Aspect B13

The bearing is supported by a bearing support that is originally separate from the inner housing and is attached to the inner housing within the housing space, and the second bevel gear is between the inner housing and the bearing support.

The above-described embodiment is merely exemplary, and the power tool according to the Aspects B1 to B13 of the present disclosure is not limited to the rotary hammer 1 of the above-described embodiment. For example, the following non-limiting modifications may be made. Further, at least one of these modifications may be employed in combination with at least one of the rotary hammer 1 of the above-described embodiment, the above-described modifications, the above-described Aspects A1 to A8, the above-described Aspects B1 to B13, and the claimed features.

For example, the power tool according to the present disclosure may be embodied as a power tool having a hammer (striking) mechanism that is configured to perform only the hammer action (e.g., an electric hammer (a demolition hammer or a scraper)). The structures and/or arrangements of the body housing, the inner housing, the motor, and the hammer mechanism in the power tool may be appropriately changed from those in the above-described embodiment.

In the above-described embodiment, the inlet opening 241 of the air ventilation hole 24 is positioned to correspond to the center (the rotational axis RX) of the second bevel gear 53 that is fixed to the intermediate shaft 52, and thus it is preferable in that the lubricant is the most difficult to reach the inlet opening 241. However, the position of the inlet opening 241 may be changed to any position, as long as it corresponds to a region that is radially inward of the radially inner edge of the gear teeth 531 of the second bevel gear 53. Further, the air ventilation hole 24 may extend along a straight line that is oblique relative to the rotational axis RX. Alternatively, the air ventilation hole 24 may be bent or curved. Further, the protrusion 205 of the inner housing 20 and the recess 25 of the second bevel gear 53 and the intermediate shaft 52 may be omitted, and the inlet opening 241 of the air ventilation hole 24 may directly face the rear end surface of the second bevel gear 53.

In the above-described embodiment, the position of the air ventilation hole 24 corresponds to the second bevel gear 53, considering that the second bevel gear 53 has a larger diameter than the first bevel gear 33 and thus has the above-described advantages. However, the air ventilation hole 24 may be provided at a position that corresponds to the first bevel gear 33.

DESCRIPTION OF THE REFERENCE NUMERALS

1: rotary hammer, 10: body housing, 101: first space, 102: second space, 105: air inlet opening, 106: guide rib, 107: air outlet opening, 11: first housing part, 111: barrel part, 113: opening, 15: second housing part, 150: rear wall part, 151: upper half, 153: lower half, 17: handle, 171: grip part, 173: trigger, 175; switch, 20: inner housing, 200: internal space, 201: opening, 202: peripheral wall part, 203: rear wall part, 204: groove, 205: protrusion, 207: tubular part, 208: filter, 22: support body, 221: main part, 223: arm part, 224: support hole, 225: support shaft, 23: bearing support, 230: opening, 24: air ventilation hole, 241: inlet opening, 242: outlet opening, 25: recess, 251: opening, 28: seal member, 30: controller, 31: motor, 310: motor body, 315: motor shaft, 321: bearing, 323: bearing, 33: first bevel gear, 331: gear teeth, 35: fan, 4: driving mechanism, 40: spindle, 401: bearing, 402: bearing, 41: tool holder, 410: opening, 42: cylinder, 5: hammer mechanism, 51: motion converting mechanism, 52: intermediate shaft, 521: bearing, 522: bearing, 53: second bevel gear, 531: gear teeth, 533: mount part, 54: rotary member, 55: oscillating member, 550: ring part, 551: oscillating arm, 552: protrusion, 57: piston, 571: rear end portion, 573: coupling pin, 58: hammer element, 581: striker, 583: impact bolt, 59: air chamber, 6: rotation transmitting mechanism, 61: driving gear, 63: driven gear, 7: counterweight, 71: support hole, 73: engagement hole, 91: tool accessory, 93: battery, DX: driving axis, MX: motor axis, PX: pivot axis, RX: rotational axis

What is claimed is:

1. A reciprocating tool that is configured to linearly reciprocate a tool accessory, the reciprocating tool comprising:

a motor that has a motor shaft that is rotatable around a motor axis;

a motion converting mechanism that is (i) operably coupled to the motor shaft and (ii) is configured to convert rotation into linear reciprocating motion along a driving axis that defines a front-rear direction of the reciprocating tool;

a body housing;

an inner housing that (i) is within the body housing and (ii) houses at least a portion of the motion converting mechanism;

a support body that (i) is originally separate from the inner housing and (ii) is attached to the inner housing; and a counterweight that (i) is operably coupled to the motion converting mechanism and (ii) is configured to be driven by the motion converting mechanism, wherein:

the counterweight is (i) supported by the support body to be pivotable around a pivot axis that extends in a direction orthogonal to the driving axis and (ii) supported by the support body via a support shaft that extends along the pivot axis;

the support body directly supports the support shaft; and at least a portion of the counterweight is within the inner housing.

2. The reciprocating tool as defined in claim 1, wherein:

the support shaft is in an internal space of the inner housing.

3. The reciprocating tool as defined in claim 2, wherein the support body includes:

a main body that is at least partially on an outside of the inner housing, and an arm part that protrudes from the main body into the inner housing and supports the support shaft.

4. The reciprocating tool as defined in claim 3, wherein:

the body housing includes (i) a first housing part that houses the motion converting mechanism, and (ii) a second housing part that is coupled to a rear end portion of the first housing part and houses the motor, the inner housing is a hollow body that has an open front end, a closed circumference around the driving axis, and a closed rear end, and the inner housing is fitted into the rear end portion of the first housing part.

5. The reciprocating tool as defined in claim 4, wherein:

at least a portion of the main body of the support body is disposed frontward of the inner housing in the front-rear direction, and the arm part extends rearward from the main body into the inner housing.

6. The reciprocating tool as defined in claim 5, further comprising:

a seal that is disposed between an outer surface of a front end portion of the inner housing and an inner surface of the rear end portion of the body housing, wherein:

the seal is configured to partition an internal space of the body housing into (i) a first space in which the motion converting mechanism is disposed and (ii) a second space in which the motor is disposed, and the seal is disposed frontward of the pivot axis of the counterweight in the front-rear direction.

7. The reciprocating tool as defined in claim 6, wherein:

an extension direction of the pivot axis defines a left-right direction of the reciprocating tool, a direction that is orthogonal to the front-rear direction and the left-right direction defines an up-down direction of the reciprocating tool, and the body housing has:

an air inlet opening that (i) is above an upper end of the seal in the up-down direction and rearward of the seal in the front-rear direction and (ii) communicates with the second space, and an air outlet opening that (i) is below a lower end of the seal in the up-down direction and (ii) communicates with the second space.

8. The reciprocating tool as defined in claim 2, further comprising:

a seal member that is disposed between the body housing and the inner housing, wherein the seal member is frontward of the pivot axis of the counterweight in the front-rear direction.

9. The reciprocating tool as defined in claim 8, wherein:

an extension direction of the pivot axis defines a left-right direction of the reciprocating tool, a direction that is orthogonal to the front-rear direction and the left-right direction defines an up-down direction of the reciprocating tool, and the body housing has:

an air inlet opening that is above an upper end of the seal member in the up-down direction, and an air outlet opening that is below a lower end of the seal member in the up-down direction.

10. The reciprocating tool as defined in claim 1, further comprising:

a spindle that is tubular and configured to hold the tool accessory to be movable along the driving axis, and a striker that (i) is disposed within the spindle and (ii) is configured to be driven by the motion converting mechanism to apply a striking force to the tool accessory, wherein the support body supports the spindle.

11. The reciprocating tool as defined in claim 10, further comprising:

an intermediate shaft that (i) is operably coupled to the motor shaft and (ii) is rotatable around a rotational axis that extends in parallel to the driving axis, wherein a portion of the motion converting mechanism is disposed on the intermediate shaft.

12. The reciprocating tool as defined in claim 11, wherein the motor axis intersects the rotational axis of the intermediate shaft.

13. The reciprocating tool as defined in claim 12, wherein:

an extension direction of the pivot axis defines a left-right direction of the reciprocating tool, a direction that is orthogonal to the front-rear direction and the left-right direction defines an up-down direction of the reciprocating tool, the body housing includes an air inlet opening and an air outlet opening, and the air inlet opening is above the driving axis in the up-down direction.

14. The reciprocating tool as defined in claim 13, wherein:

an air passage is defined within the body housing, and the air passage is configured such that air, which has flowed into the body housing through the air inlet opening, flows along the inner housing, passes through an inside of the motor, and flows out of the body housing through the air outlet opening.

15. The reciprocating tool as defined in claim 10, further comprising:

a bearing that supports the spindle to be rotatable around the driving axis, wherein:

the support body includes (i) a main body that is at least partially disposed frontward of the inner housing, and (ii) an arm part that protrudes rearward from the main body, the bearing is fitted in the main body of the support body, the arm part supports a support shaft that extends along the pivot axis within the inner housing, and the counterweight is supported by the support body via the support shaft.

16. A reciprocating tool that is configured to linearly reciprocate a tool accessory, the reciprocating tool comprising:

a motor that has a motor shaft that is rotatable around a motor axis;

a motion converting mechanism that is (i) operably coupled to the motor shaft and (ii) is configured to convert rotation into linear reciprocating motion along a driving axis that defines a front-rear direction of the reciprocating tool;

a body housing;

an inner housing that (i) is within the body housing and (ii) houses at least a portion of the motion converting mechanism;

a support body that (i) is originally separate from the inner housing and (ii) is attached to the inner housing; and a counterweight that (i) is operably coupled to the motion converting mechanism and (ii) is configured to be driven by the motion converting mechanism, wherein:

the counterweight is supported by the support body to be pivotable around a pivot axis that extends in a direction orthogonal to the driving axis;

at least a portion of the counterweight is within the inner housing, the counterweight is supported by the support body via a support shaft that extends along the pivot axis, the support shaft is in an internal space of the inner housing, the support body includes:

a main body that is at least partially on an outside of the inner housing, and an arm part that protrudes from the main body into the inner housing and supports the support shaft, the body housing includes (i) a first housing part that houses the motion converting mechanism, and (ii) a second housing part that is coupled to a rear end portion of the first housing part and houses the motor, the inner housing is a hollow body that has an open front end, a closed circumference around the driving axis, and a closed rear end, the inner housing is fitted into the rear end portion of the first housing part, at least a portion of the main body of the support body is disposed frontward of the inner housing in the front-rear direction, the arm part extends rearward from the main body into the inner housing, wherein the reciprocating tool further comprises a seal that is disposed between an outer surface of a front end portion of the inner housing and an inner surface of the rear end portion of the body housing, wherein:

the seal is configured to partition an internal space of the body housing into (i) a first space in which the motion converting mechanism is disposed and (ii) a second space in which the motor is disposed, and the seal is disposed frontward of the pivot axis of the counterweight in the front-rear direction.

* * * * *